United States Patent
Mochida et al.

(10) Patent No.: US 10,790,713 B2
(45) Date of Patent: Sep. 29, 2020

(54) ROTATING ELECTRICAL MACHINE WITH ROTOR WITH PLURALITY OF UMBRELLA-SHAPED PORTIONS WITH DEMAGNETIZED CENTER BRIDGE PORTIONS

(71) Applicant: FUJI ELECTRIC CO., LTD., Kawasaki-shi, Kanagawa (JP)

(72) Inventors: Toshiharu Mochida, Suzuka (JP); Satoshi Imamori, Hino (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 926 days.

(21) Appl. No.: 15/231,821

(22) Filed: Aug. 9, 2016

(65) Prior Publication Data
US 2016/0352164 A1 Dec. 1, 2016

Related U.S. Application Data

(63) Continuation of application No. PCT/JP2014/071252, filed on Aug. 11, 2014.

(51) Int. Cl.
*H02K 1/00* (2006.01)
*H02K 1/27* (2006.01)
(Continued)

(52) U.S. Cl.
CPC ........... *H02K 1/276* (2013.01); *H02K 1/2766* (2013.01); *H02K 15/03* (2013.01); *H02K 19/10* (2013.01); *H02K 21/14* (2013.01)

(58) Field of Classification Search
CPC .... H02K 1/274; H02K 1/2746; H02K 1/2753; H02K 1/276; H02K 1/2766;
(Continued)

(56) References Cited

U.S. PATENT DOCUMENTS 5,811,904 A * 9/1998 Tajima ............... H02K 1/276
310/156.45
6,034,458 A * 3/2000 Uetake ............... H02K 21/14
310/156.49
(Continued)

FOREIGN PATENT DOCUMENTS

JP 2002-010594 A 1/2002
JP 2002-069593 A 3/2002
(Continued)

OTHER PUBLICATIONS

JP2014079068 English Translation.*
Q-Axis and D Axis, Understanding of Permanent Magnet Motors.*
JP2014079 English Translation.*

*Primary Examiner* — Maged M Almawri
(74) *Attorney, Agent, or Firm* — Rabin & Berdo, P.C.

(57) ABSTRACT

Provided is a rotating electrical machine that has superior rotor strength and can be manufactured at low cost, wherein torque generated by a rotor can be increased. Two holes are formed in a circumferential direction in each pole in a rotor. The two holes communicate with an outer periphery of the rotor, and an outer peripheral edge portion on an outer side in a radial direction of the rotor of the two holes is connected via a center bridge between the two holes to a core portion on an inner side in the radial direction of the rotor in each pole. The center bridge is demagnetized, or the permeability thereof is reduced. Consequently, leakage flux passing through the center bridge can be reduced, even when the width of the center bridge is increased.

20 Claims, 6 Drawing Sheets

(51) Int. Cl.
*H02K 19/10* (2006.01)
*H02K 15/03* (2006.01)
*H02K 21/14* (2006.01)

(58) Field of Classification Search
CPC ........ H02K 1/2733; H02K 1/278; H02K 1/28;
H02K 1/30; H02K 21/14; H02K 2213/03;
H02K 19/10; H02K 15/03
USPC ............ 310/156.01, 156.38, 156.39, 156.44,
310/156.46, 156.11, 156.57, 156.56,
310/156.53, 156.83, 156.58
See application file for complete search history.

(56) References Cited

U.S. PATENT DOCUMENTS

| | | | | |
|---|---|---|---|---|
| 6,208,054 B1* | 3/2001 | Tajima | H02K 1/276 | 310/156.53 |
| 6,472,789 B1* | 10/2002 | Akemakou | H02K 21/042 | 310/156.49 |
| 6,486,581 B2* | 11/2002 | Miyashita | H02K 1/276 | 310/156.01 |
| 6,741,003 B2* | 5/2004 | Naito | H02K 1/2766 | 310/156.48 |
| 6,847,144 B1* | 1/2005 | Luo | H02K 1/276 | 310/156.49 |
| 6,940,199 B2* | 9/2005 | Imamura | H02K 1/278 | 310/156.01 |
| 7,560,842 B2* | 7/2009 | Hattori | H02K 1/2766 | 310/156.53 |
| 7,847,456 B2* | 12/2010 | Kori | H02K 1/276 | 310/156.01 |
| 7,994,666 B2* | 8/2011 | Kori | H02K 1/276 | 310/156.01 |
| 8,212,447 B2* | 7/2012 | Fukuda | H02K 1/276 | 310/156.53 |
| 8,350,434 B2* | 1/2013 | Hori | H02K 1/276 | 310/156.53 |
| 8,502,430 B2* | 8/2013 | Yamada | H02K 1/2746 | 310/156.53 |
| 8,766,468 B1* | 7/2014 | Rilla | B60L 3/0023 | 290/45 |
| 8,841,807 B2* | 9/2014 | Taniguchi | H02K 1/2746 | 310/156.49 |
| 9,041,268 B2* | 5/2015 | Tomohara | H02K 1/2766 | 310/156.53 |
| 9,397,526 B2* | 7/2016 | Akasako | H02K 1/278 | |
| 9,502,932 B2* | 11/2016 | Date | H02K 1/276 | |
| 9,748,806 B2* | 8/2017 | Koka | B60L 50/51 | |
| 10,348,144 B2* | 7/2019 | Oketani | H02K 1/2766 | |
| 2004/0041483 A1* | 3/2004 | Gary | H02K 1/276 | 310/156.08 |
| 2005/0110356 A1* | 5/2005 | Imamura | H02K 1/278 | 310/156.53 |
| 2006/0113858 A1* | 6/2006 | Hino | H02K 1/276 | 310/156.53 |
| 2007/0126304 A1* | 6/2007 | Ito | H02K 1/2766 | 310/156.53 |
| 2007/0126305 A1* | 6/2007 | Okuma | H02K 1/276 | 310/156.53 |
| 2008/0191578 A1* | 8/2008 | Evans | H02K 1/02 | 310/216.012 |
| 2009/0224624 A1* | 9/2009 | Kumar | H02K 1/246 | 310/156.53 |
| 2009/0224627 A1* | 9/2009 | Hino | H02K 1/276 | 310/216.077 |
| 2010/0194221 A1* | 8/2010 | Kori | H02K 1/276 | 310/61 |
| 2011/0050022 A1* | 3/2011 | Li | H02K 1/276 | 310/156.46 |
| 2011/0062815 A1* | 3/2011 | Aota | H02K 1/276 | 310/156.53 |
| 2011/0121677 A1* | 5/2011 | Ley | H02K 1/2766 | 310/156.53 |
| 2012/0074801 A1* | 3/2012 | Brown | H02K 1/2766 | 310/59 |
| 2012/0112592 A1* | 5/2012 | Yamada | H02K 1/2746 | 310/156.53 |
| 2012/0200187 A1* | 8/2012 | Sano | H02K 1/2766 | 310/156.07 |
| 2012/0248915 A1* | 10/2012 | Kagami | H02K 1/2766 | 310/156.01 |
| 2013/0043757 A1* | 2/2013 | Kagami | H02K 1/2766 | 310/156.53 |
| 2013/0119812 A1* | 5/2013 | Takizawa | H02K 1/276 | 310/156.53 |
| 2013/0134817 A1* | 5/2013 | Nagahama | H02K 1/28 | 310/156.08 |
| 2013/0307363 A1* | 11/2013 | Sano | H02K 1/2766 | 310/156.01 |
| 2014/0145538 A1* | 5/2014 | Date | H02K 1/276 | 310/156.53 |
| 2014/0184009 A1* | 7/2014 | Taniguchi | H02K 1/2746 | 310/156.53 |
| 2014/0217848 A1* | 8/2014 | Jurkovic | H02K 1/2766 | 310/156.53 |
| 2014/0252903 A1* | 9/2014 | Rahman | H02K 1/02 | 310/156.53 |
| 2015/0229170 A1* | 8/2015 | Koechlin | H02K 1/2766 | 310/156.53 |
| 2015/0318744 A1* | 11/2015 | Ekin | H02K 1/2773 | 310/156.56 |
| 2017/0040854 A1* | 2/2017 | Saint-Michel | H02K 3/12 | |
| 2017/0338707 A1* | 11/2017 | Shono | H02K 1/2766 | |

FOREIGN PATENT DOCUMENTS

| | | | | |
|---|---|---|---|---|
| JP | 2004-364368 A | | 12/2004 | |
| JP | 2005-130604 A | | 5/2005 | |
| JP | 2005-269840 A | | 9/2005 | |
| JP | 2010-193660 A | | 9/2010 | |
| JP | 2010-220359 A | | 9/2010 | |
| JP | 2011-004480 A | | 1/2011 | |
| JP | 2012-080718 A | | 4/2012 | |
| JP | 2012-205472 A | | 10/2012 | |
| JP | 2013-046421 A | | 3/2013 | |
| JP | 2013-143791 A | | 7/2013 | |
| JP | 2014-079068 A | | 5/2014 | |
| JP | 2014079068 | * | 5/2014 | ............... H02K 1/27 |

* cited by examiner

ROTATING ELECTRICAL MACHINE WITH ROTOR WITH PLURALITY OF UMBRELLA-SHAPED PORTIONS WITH DEMAGNETIZED CENTER BRIDGE PORTIONS

This application is a continuation under 35 U.S.C. 120 of International Application PCT/JP2014/071252 having the International Filing Date of Aug. 11, 2014, which is fully incorporated herein by reference.

TECHNICAL FIELD

The present invention relates to a rotating electrical machine such as a motor or generator.

BACKGROUND ART

FIG. 8B and FIG. 8B are sectional views showing a configuration of a rotor of an IPM motor, which is an example of an existing permanent magnet embedded type rotating electrical machine, while FIG. 8C is a diagram showing an outer peripheral surface thereof. The IPM motor of the existing example is disclosed in PTL 1. The IPM motor has as one pole two permanent magnets 13a and 13b disposed in a V-shape so as to extend toward the outer side of a rotor 10, and multiple poles are formed by multiple sets of the two permanent magnets 13a and 13b being embedded in the interior of the rotor 10. Also, the rotor 10 is configured by a laminated steel plate 11 shown in FIG. 8A and a laminated steel plate 12 shown in FIG. 8B being alternately stacked one at a time, or in units of a multiple thereof, as shown in FIG. 8C.

As shown in FIG. 8A, two holding hole portions 18a and 18b, two cavity portions 14a and 14b, and two cavity portions 15a and 15b are formed as one pole in the laminated steel plate 11, and multiple sets of these are formed. Specifically, the two holding hole portions 18a and 18b, which are disposed in a V-shape and hold the two permanent magnets 13a and 13b, the two cavity portions 14a and 14b, which are disposed in a portion (a V-shaped central portion) between the two holding hole portions 18a and 18b and communicate with the holding hole portions 18a and 18b respectively, and the two cavity portions 15a and 15b, which are disposed in a portion (a V-shaped end portion) between the pole and a neighboring pole and communicate with the holding hole portions 18a and 18b respectively, are formed as one pole.

As the holding hole portion 18a, cavity portion 14a, and cavity portion 15a form one continuous region (hole), and the holding hole portion 18b, cavity portion 14b, and cavity portion 15b also form one continuous region (hole), it is sufficient that each region is punched as one hole when carrying out a punching process on the laminated steel plate 11. Side bridges 19a and 19b are formed by the punching process on outer edge sides of the cavity portions 15a and 15b.

Also, as shown in FIG. 8B, two holding hole portions 18a' and 18b', two cavity portions 14a' and 14b', and two cutout portions 16a and 16b are formed as one pole in the laminated steel plate 12, and multiple sets of these are formed. The holding hole portions 18a' and 18b' and cavity portions 14a' and 14b' in the laminated steel plate 12 are equivalent to the holding hole portions 18a and 18b and cavity portions 14a and 14b in the laminated steel plate 11. Specifically, the two holding hole portions 18a' and 18b', which are disposed in a V-shape and hold the two permanent magnets 13a and 13b, the two cavity portions 14a' and 14b', which are disposed in a portion (a V-shaped central portion) between the two holding hole portions 18a' and 18b' and communicate with the holding hole portions 18a' and 18b' respectively, and the two cutout portions 16a and 16b, which are disposed so as to be aligned with the cavity portions 15a and 15b respectively, communicate with the holding hole portions 18a' and 18b' respectively, and are opened as far as the outer edge of the laminated steel plate 12, are formed as one pole. The cutout portions 16a and 16b are disposed so as to include the cavity portions 15a and 15b respectively in the interiors thereof, because of which the cutout portions 16a and 16b are disposed so as to be aligned with the cavity portions 15a and 15b respectively.

As the holding hole portion 18a', cavity portion 14a', and cutout portion 16a form one continuous region (cutout), and the holding hole portion 18b', cavity portion 14b', and cutout portion 16b form one continuous region (cutout), it is sufficient that each region is punched as one cutout when carrying out a punching process on the laminated steel plate 12.

There is a center bridge 19c between the cavity portion 14a and cavity portion 14b in the laminated steel plate 11, and between the cavity portion 14a' and cavity portion 14b' in the laminated steel plate 12. Regions farther to the inner peripheral side and regions farther to the outer peripheral side than the permanent magnets in the laminated steel plates 11 and 12 are connected via the center bridge 19c.

Further, when the laminated steel plates 11 and 12 are alternately stacked one at a time, the outer peripheral surface of the rotor 3 takes on the appearance shown in FIG. 8C, in which the cutout portions 16a and 16b form rows, and are disposed in every other laminated steel plate.

In this existing example, the laminated steel plate 11 and laminated steel plate 12 are alternately stacked, and magnetic flux passes through the cutout portions 16a and 16b in the laminated steel plate 12, because of which magnetic short-circuiting can be reduced in the laminated steel plate 11, even when the width of the side bridges 19a and 19b is not reduced. Specifically, as the laminated steel plate 12 has the cutout portions 16a and 16b, a total sectional area that is the sectional areas of an iron core between the permanent magnets and rotor outer peripheral surface in each steel plate added together (that is, a total sectional area that is the sectional areas of the side bridge 19a and 19b portions added together) is halved, as a result of which magnetic short-circuiting is reduced.

Also, in the laminated steel plate 12, the cutout portions 16a and 16b are formed in a region between the pole and a neighboring pole, and no iron core exists, because of which magnetic resistance in the cutout portions 16a and 16b can be greater than magnetic resistance in the side bridges 19a and 19b. Further, as the laminated steel plate 11 and laminated steel plate 12 are alternately stacked, magnetic resistance can be greater than when only the laminated steel plate 11 is used. Consequently, by magnetic short-circuiting in the cutout portions 16a and 16b being reduced, flux leakage is restricted, a large amount of magnetic flux can be supplied to a stator side, and an increase in motor efficiency can be achieved. Furthermore, in the laminated steel plate 12, an iron core exists in portions through which d axis magnetic flux and q axis magnetic flux pass, because of which a desired reluctance torque can be maintained.

According to the heretofore described configuration, even when it is necessary that the side bridges 19a and 19b are of a predetermined width for the sake of the punching process or centrifugal force resistance, magnetic resistance can be increased and flux leakage restricted, while securing the predetermined width as the width of the side bridges 19a and 19b, owing to the existence of the cutout portions 16a and 16b.

CITATION LIST

Patent Literature

PTL 1: JP-A-2011-4480

SUMMARY

Herein, the heretofore described existing permanent magnet embedded type rotating electrical machine is such that the rotor is configured of multiple kinds of rotor steel material of differing forms, because of which the following problems exist. Firstly, multiple kinds of punching die for manufacturing rotor steel material are necessary when manufacturing the rotor, and there is a problem in that management of members and dies is troublesome. Also, the rotor steel materials of differing forms have mutually differing strength characteristics. Despite this, the existing permanent magnet embedded type rotating electrical machine is such that the forms and dispositions of magnets and shafts need to be the same among the multiple kinds of rotor steel material. Therefore, the design scope of the forms and dispositions of magnets and shafts is considerably narrowed. As a result of this, the magnets are unavoidably small and the shafts unavoidably thin, because of which the rotation speed or torque of the rotating electrical machine is greatly limited. Also, when the rotor is configured by stacking multiple kinds of rotor steel material of differing forms, three-dimensional magnetic field calculation and strength calculation are necessary when designing the rotor, and there is a problem in that the calculation load increases and the calculation accuracy decreases. Also, multiple kinds of rotor steel material of differing forms cannot be formed from a single piece of steel material by, for example, carrying out a removal process using wire cutting or the like. Therefore, there is a problem in that the processing cost increases.

Also, the existing permanent magnet embedded type rotating electrical machine is such that the side bridges 19a and 19b are in one kind of the two kinds of steel plate configuring the rotor, because of which the following problems exist. Firstly, as the side bridges 19a and 19b exist, there still remains a not inconsiderable amount of permanent magnet leakage flux, and magnetic resistance is also far from zero. This is an impediment to torque generated in the rotor being increased. Also, as the existing permanent magnet embedded type rotating electrical machine is such that the side bridges 19a and 19b are in the rotor, ventilation in the rotor axial direction is poor. The poor rotor ventilation is a factor in impeding cooling of the rotor, and in particular of the permanent magnets. Also, as the side bridges 19a and 19b are in the rotor, there is a problem in that the strength supporting the permanent magnets against centrifugal force is uneven, and a large stress is generated in the interior of the permanent magnets.

Also, a permanent magnet embedded type rotating electrical machine is generally such that, when rotor steel material is fitted and fixed into a shaft, circumferential direction assembly residual stress remains in the rotor steel material. A range in which the assembly residual stress mainly remains is a radial range in which no hole or cutout exists in a circumference centered on the rotor shaft (that is, a range connected in a ring form). In the case of the existing example, the side bridges 19a and 19b exist, because of which there is a ring-form region on the outermost periphery of the rotor, and tensile residual stress remains in the ring-form region on the outermost periphery. Also, shear stress caused by centrifugal force is applied to the side bridges 19a and 19b when the rotor rotates. Consequently, the widths of the side bridges 19a and 19b need to be increased in order to prevent damage to the side bridges 19a and 19b when the rotor rotates. Therefore, it is difficult to reduce leakage flux in the existing example.

Also, in the existing example, large assembly residual stress remains near the position of the center bridge 19c. In addition, large tensile stress caused by centrifugal force (hereafter, centrifugal stress) is generated in the center bridge 19c when the rotor rotates. The rotor of the existing permanent magnet embedded type rotating electrical machine is such that the region in which the assembly residual stress occurs and the region in which the centrifugal stress is generated are in proximity to each other, meaning that rotor strength design is difficult. In order to enable high speed rotor rotation, it is necessary that no large stress is generated in the range over which tensile residual stress occurs. It is also conceivable, for example, that a large chamfering of the radius of curvature is carried out on the center bridge 19c in order to relax stress. However, when this kind of large chamfering of the radius of curvature is performed, the space in which the magnets are disposed decreases, and torque is limited. As heretofore described, the existing example is such that there is no effective means of relaxing stress, because of which there is a problem in that the rotor rotation speed is restricted, or the size of the magnets is restricted, whereby torque is restricted.

Also, generally, when unevenness is provided in the outer peripheral surface of the rotor, a higher harmonic component of torque generated in the rotor can be converted to a fundamental wave component, whereby torque ripple can be reduced and torque increased. However, in the case of a rotor that has a ring-form outermost periphery region with no hole or dimple on the outer side of a magnet embedding hole, as in the existing example, assembly residual stress remains in the ring-form region on the outermost periphery. Consequently, it is difficult with existing rotors to provide unevenness that leads to a concentration of stress in the outermost peripheral surface of a rotor in which this kind of residual stress remains. Therefore, existing permanent magnet embedded type rotating electrical machines are such that it is difficult to increase torque by providing unevenness in the outer peripheral surface of the rotor.

Also, in the existing example, the center bridge is still of a ferromagnetic material, because of which there still remains a not inconsiderable amount of permanent magnet leakage flux, which is far from zero. This is an impediment to torque generated in the rotor being increased.

The invention, having been contrived considering the heretofore described kind of situation, has a first object of providing a rotating electrical machine that has superior rotor strength, and that can be manufactured at low cost. Also, a second object of the invention is to increase torque generated by the rotor, without reducing the strength of the rotor.

The invention provides a rotating electrical machine including a rotor in which an even number of holes neighboring in a circumferential direction and sandwiching a center bridge are formed in each pole, wherein the even number of holes sandwiching the center bridge in each pole of the rotor communicate with an outer periphery of the rotor on a side opposite to that of the center bridge, and the center bridge is demagnetized, or a permeability of the center bridge is reduced further than that of a portion of the rotor other than the center bridge.

Advantageous Effects of Invention

According to the invention, an even number of holes of one pole are caused to communicate with the outer periphery of a rotor, because of which no region in which assembly residual stress remains occurs in the outermost periphery of the rotor. Therefore, the strength of the rotor when rotating can be increased. Also, as the configuration is such that the even number of holes of one pole are caused to communicate with the outer periphery of the rotor, and no side bridge is necessary from the outset, there is no need either to configure the rotor by combining a steel plate in which there is no side bridge and a steel plate in which there is a side bridge in order to reduce leakage flux. Consequently, the rotor can be manufactured by stacking one kind of steel plate only. Furthermore, the center bridge is demagnetized, or the permeability thereof is reduced, because of which there is extremely little leakage flux. Therefore, magnetic flux that contributes to output torque can be increased, even with the same number of magnets.

DETAILED DESCRIPTION

Figure 1:
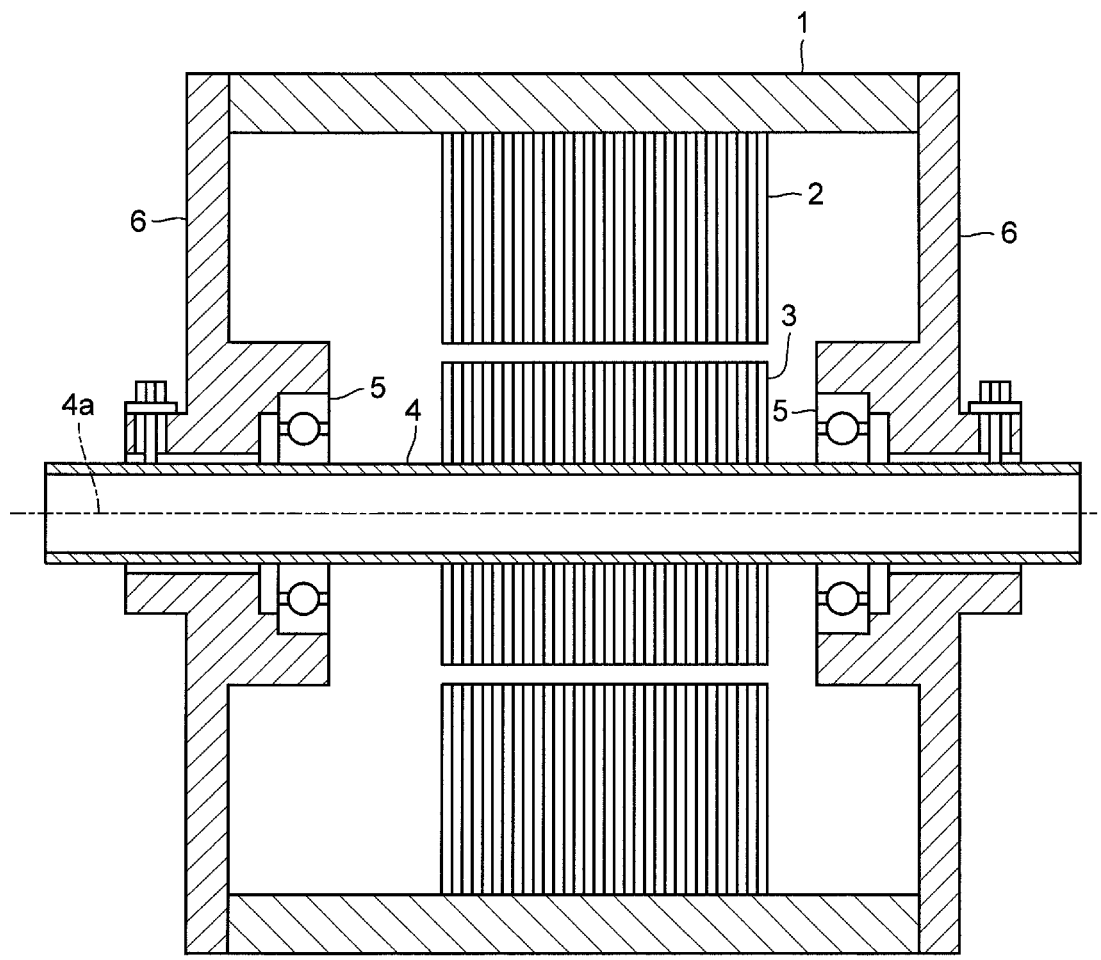
FIG. 1 is a vertical sectional view showing an overall configuration of a permanent magnet embedded type rotating electrical machine, which is an embodiment of a rotating electrical machine according to the invention.

Hereafter, referring to the drawings, embodiments of the invention will be described.

FIG. 1 is a vertical sectional view showing an overall configuration of a permanent magnet embedded type rotating electrical machine, which is an embodiment of the invention. In FIG. 1, a frame 1 is a housing that covers the whole of a permanent magnet embedded type rotating electrical machine, and is configured of iron, aluminum, stainless steel, or the like. A fixed side iron core 2 of a hollow cylindrical form is provided on the inner side of the frame 1. The fixed side iron core 2 is formed by stacking silicon steel plates. A hole is provided in the fixed side iron core 2, and a stator winding formed of copper wire or the like is inserted through the hole (omitted from the drawing). A rotor 3, which is a rotating side iron core, is inserted on the inner side of the fixed side iron core 2 in a state such that there is a predetermined gap between the rotor 3 and the fixed side iron core 2. The rotor 3 is formed by stacking silicon steel plates. A shaft 4 whose center is formed of iron or the like penetrates the rotor 3. Ideally, a central axis of the shaft 4 forms a central axis of rotation 4a of the rotor 3. Further, the shaft 4 is supported by a shield 6, provided at both the front and back ends of the frame 1, via a rolling bearing 5 formed of bearing steel or the like.

In this example, the permanent magnet embedded type rotating electrical machine is a motor. In the motor, the rotor 3 is provided with energy by a rotating magnetic field created by the stator winding (not shown), and rotates around the central axis of rotation 4a.

Figure 2:
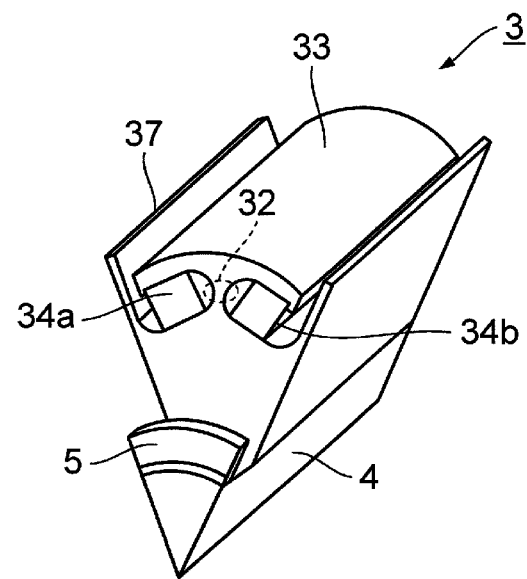
FIG. 2 is a perspective view showing a configuration of one pole of a rotor in the same embodiment.
Figure 3:
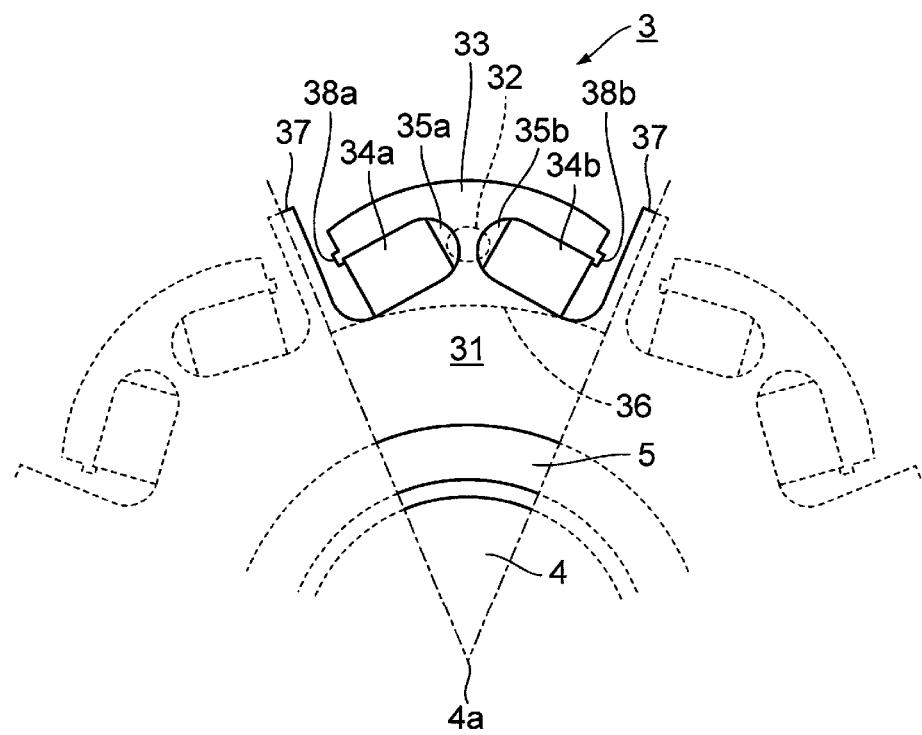
FIG. 3 is a front view of the one pole of the rotor seen from the direction of a central axis of rotation in the same embodiment.

A characteristic of this embodiment is in the configuration of the rotor 3. FIG. 2 is a perspective view showing a configuration of one pole of the rotor 3 in this embodiment. Also, FIG. 3 is a front view of the one pole of the rotor 3 seen from the direction of the central axis of rotation 4a. In addition to the configuration of the one pole, configurations of poles on either side of the one pole in the direction of rotation are shown by broken lines in FIG. 3, in order to facilitate understanding of the configuration of the rotor 3.

The rotor 3 according to this embodiment can be broadly divided into a core portion 31 to the central axis of rotation 4a side, two permanent magnets 34a and 34b provided in each pole, an outer peripheral edge portion 33 of each pole formed of a rotor steel material on the outer side of the permanent magnets 34a and 34b as seen from the central axis of rotation 4a, a center bridge 32 of each pole, formed between magnet embedding holes 35a and 35b and connecting the core portion 31 and outer peripheral edge portion 33, and a q axis projection 37 provided between poles.

The outer peripheral edge portion 33 of the one pole has an approximately arc-form cross-section, and is connected to the core portion 31 via the center bridge 32 in the rotational direction center of the rotor. The outer peripheral surface of the outer peripheral edge portion 33 has a radius of curvature smaller than the distance from the central axis of rotation 4a to the outermost peripheral portion of the rotor. The radius of curvature of one portion of the outer peripheral edge portion 33, rather than that of the whole of the outer peripheral edge portion 33 as heretofore described, may be smaller than the distance from the central axis of rotation 4a to the outermost peripheral portion of the rotor. Also, it is not necessary that the outer peripheral surface of the outer peripheral edge portion 33 is a curved surface, provided that the distance from the rotational center of the rotor of the outer peripheral surface of the outer peripheral edge portion 33 located on an extension of a straight line that passes through the center bridge 32 as seen from the rotational center of the rotor is longer than that of the outer peripheral surface in another position. In this way, by increasing the magnetic resistance of the center bridge 32, and reducing the magnetic resistance of a stator disposed on the outer periphery of the rotor and of the outer peripheral edge portion 33, the torque of the permanent magnet embedded type rotating electrical machine can be increased.

The magnet embedding hole 35a for holding the permanent magnet 34a and the magnet embedding hole 35b for holding the permanent magnet 34b are provided on the inner side of the outer peripheral edge portion 33. The magnet embedding holes 35a and 35b are enclosed in three directions by the outer peripheral edge portion 33, center bridge 32, and core portion 31. The outer peripheral edge portion 33 supports the permanent magnets 34a and 34b on the central axis of rotation 4a side against centrifugal force working on the permanent magnets 34a and 34b when the rotor 3 rotates. The outer peripheral edge portions 33 corresponding to each pole are aligned in the rotor rotation direction, with a gap between neighboring outer peripheral edge portions 33. The gap between two outer peripheral edge portions 33 is located on a side opposite to that of the center bridge 32, that is, centrally between the two poles. The magnet embedding holes 35a and 35b communicate with the rotor outer periphery via the gap between the two outer peripheral edge portions 33.

The magnet embedding holes 35a and 35b are arrayed in a reverse V-shape. Further, a region (the core portion 31) on the central axis of rotation 4a side of the inner peripheral walls of the magnet embedding holes 35a and 35b inclines farther in a direction away from the central axis of rotation 4a as the region is approached from the center of neighboring poles toward a portion between the two magnet embedding holes (that is, the center bridge 32). Therefore, the center bridge 32 is in a position to the outer side in the rotor radial direction from an inscribed circle 36 of all the magnet embedding holes 35a and 35b of the rotor 3.

The q axis projection 37 passes through the gap between two outer peripheral edge portions 33 in a central position between poles of the core portion 31, and protrudes in a centrifugal direction (a direction away from the central axis of rotation 4a). Positioning projections 38a and 38b that restrict movement of the permanent magnets 34a and 34b to the q axis projection 37 side are provided in the magnet embedding holes 35a and 35b. The positioning projections 38a and 38b protrude toward the central axis of rotation 4a in regions of the inner walls of the magnet embedding holes 35a and 35b on the outer side in the rotor radial direction as seen from the permanent magnets 34a and 34b, that is, in end portions on the q axis projection 37 side on the inner side of the outer peripheral edge portion 33. The permanent magnets 34a and 34b are pressed against the positioning projections 38a and 38b, and thereby held inside the magnet embedding holes 35a and 35b. At this time, an adhesive is used in order to aid in the holding of the permanent magnets 34a and 34b in the magnet embedding holes 35a and 35b.

Also, the center bridge 32 configuring the rotor 3 is austenitized (demagnetized) by being nitrided and heated using a method disclosed in JP-A-2002-69593, after which thermal distortion is removed by cooling and annealing. A specific description is as follows.

In this embodiment, when manufacturing a laminated steel plate of the rotor 3, the saturation magnetic flux density of one portion of the member is reduced by performing a nitriding process on the center bridge 32, thereby generating a nitrided phase with a low saturation magnetic flux density in that portion. A rolled ferromagnetic plate, for example, is used as the rotor steel plate that is the target of the nitriding process. A nitriding process such as ion nitriding, ion implantation, or gas nitriding is used as the nitriding process. Processing is normally carried out at a temperature of 800° C. or less. Also, there is no need to attach a non-magnetic metal or the like in advance. Furthermore, as any ferromagnetic material that can be nitrided is sufficient, the material is not limited. Consequently, provided that it is a Fe series material, the material may be a Fe—Si series electromagnetic steel plate or the like, which is mass produced and of comparatively low cost, or a ferrite series stainless steel or the like.

As only the center bridge 32, in which it is desired to reduce the saturation magnetic flux density, is nitrided in the rotor steel plate, a portion that is not to be nitrided is masked with a metal plate or the like. The masked rotor steel plate is housed in a chamber, a substrate temperature is raised to 500 to 800° C., and a gas including nitrogen, for example, a mixed gas of nitrogen and hydrogen, is introduced into the chamber, after which a nitriding process is carried out by generating plasma using the gas, thereby forming a nitrided phase from the surface of the electromagnetic steel plate.

As nitrogen is an element of austenite formation, an austenite ($\gamma$Fe—N) is formed, or $Fe_4N$ or $Fe_{2-3}N$ is formed, depending on the cooling speed after nitriding. Of these phases, $Fe_4N$ has the highest saturation magnetic flux density, and the saturation magnetic flux density decreases in the order of $Fe_2$-3N and $\gamma$Fe—N. In particular, $\gamma$Fe—N is a non-magnetic phase. The saturation magnetic flux density of these phases is lower than the value of $\alpha$Fe.

In order to accelerate the nitriding, another additional element may be included in the master alloy, or another element may be added during the nitriding process. In the case of silicon steel, silicon itself is an element that promotes nitriding.

When the nitriding process is carried out for a long time at a high temperature, the thickness of a nitrided layer increases, and the saturation magnetic flux density decreases. Therefore, the saturation magnetic flux density of the steel plate can be adjusted to a target value by changing a nitriding process condition such as nitriding process time.

In addition to this kind of temperature and time, gas type, gas composition ratio, gas pressure, gas flow, crystal orientation, crystal particle diameter, surface state, cooling speed, accelerating voltage, and the like, affect the nitrided phase formation. That is, increasing the processing temperature, selecting the gas type during the nitriding process, and selecting the composition of the base material are factors in forming a nitrogen compound from the surface to the interior of the base material. In the case of plasma nitriding, a nitrosulphurizing or carbonitriding method can also be applied. By selecting the gas type and flow ratio, $Fe_{2-3}N$ can be grown with priority over $Fe_4N$.

Also, in addition to plasma nitriding, nitriding can be carried out using an ion implantation method or gas nitriding method. For example, when using an ion implantation method, the heretofore described compound is formed in a portion into which nitrogen ions are implanted, and the saturation magnetic flux density decreases. In these cases too, saturation magnetic flux density Bs can be reduced by optimizing the conditions.

The saturation magnetic flux density decreases in the nitriding process because a nitride is formed, because of which reduction of the saturation magnetic flux density by the nitriding process can be realized not only with a silicon steel plate, but also with a ferromagnetic alloy steel including Fe, such as carbon steel or a ferrite series stainless steel. In particular, the thickness of the nitrided phase changes depending on the existence of an alloy element or C (carbon), which easily form a compound with nitrogen, because of which it is necessary to consider the alloy element concentration of the base materials in order to obtain the set saturation magnetic flux density.

After the nitriding process, an additional heat treatment is carried out in order to remove distortion, or in order to cause distortion to diffuse.

The above is a detailed description of the method of demagnetizing the center bridge 32.

The rotor 3 in this embodiment is of a configuration that the magnet embedding holes 35a and 35b communicate with the outer periphery of the rotor. Hereafter, a reason for employing this configuration will be explained.

When manufacturing a motor, a method whereby a shaft and a rotor steel material are assembled using an interference fit such as a shrink fit is common. In this interference fit process, tensile stress remains in the circumferential direction in the rotor steel material. This residual stress occurring when the rotor is assembled also remains during high speed rotation of the rotor. It has been confirmed by calculations by the inventors of the present application using a finite element method that this residual stress barely occurs in a circumference having the same radius as a portion in which there is a hole, dimple, or the like in the rotor steel material (that is, stress remains only in a portion connected in ring form in which there is no hole or dimple).

Meanwhile, a powerful centrifugal force is generated in each portion of the rotor when the rotor rotates, especially when rotating at high speed. At this time, when the rotor has a center bridge and a side bridge as in an existing example, large centrifugal stress is generated in the center bridge and side bridge. In this case, while tensile force works on the center bridge due to the centrifugal force generated by the rotation of the rotor, shear stress is generated in the side bridge. Therefore, in order to prevent damage to the rotor due to high speed rotation, there is a need to sufficiently increase the strength of the side bridge rather than that of the center bridge, which causes difficulty in rotor strength design.

Also, in the existing example, a rotor is configured by combining a rotor steel plate with a side bridge and a rotor steel plate with no side bridge in order to achieve both an object of reducing leakage flux and an object of securing rotor strength. Therefore, the rotor of the existing example has a problem in that manufacturing cost increases, and the like.

Therefore, a configuration that the magnet embedding holes 35a and 35b communicate with the outer periphery of the rotor, that is, a configuration without the side bridge of the existing example, is employed as the configuration of the rotor in this embodiment. According to this embodiment, there is no side bridge in the outermost periphery of the rotor, because of which no assembly residual stress remains in the outermost periphery of the rotor. Centrifugal stress generated due to centrifugal force when the rotor rotates concentrates in the center bridge, but as the centrifugal stress working on the center bridge is tensile stress, measures whereby the center bridge is not damaged can easily be taken by adjusting the width of the center bridge, or the like. Moreover, the rotor configuration that the magnet embedding holes 35a and 35b communicate with the outer periphery of the rotor provides the large advantages described hereafter.

Firstly, unlike the existing example, the rotor 3 in this embodiment has the same sectional form when cut in any plane vertical to the rotor axis of rotation. Therefore, the rotor 3 in this embodiment has an advantage in terms of fabrication. Even when the rotor 3 is formed of laminated steel plates, there is no need to prepare multiple kinds of steel plate with differing hole shapes, as it is sufficient to prepare only one kind of steel plate. Consequently, the cost of the steel plates can be greatly restricted in terms of investment expenses on a punching die for forming the steel plates, in terms of part management, and in terms of strength and magnetic field design.

Also, the rotor 3 in this embodiment is such that there are less magnetic flux leakage paths than in the existing example, which has a side bridge. Therefore, magnetic flux is liable to become interlinked with the winding, which contributes to an increase in torque.

Furthermore, the rotor 3 according to this embodiment also has an advantage in terms of cooling. That is, the rotor 3 has good ventilation in the rotation axis direction, which is advantageous for cooling, particularly for magnet cooling. Consequently, regulations relating to motor capacity can be relaxed by employing the rotor 3 according to this embodiment.

Furthermore, when all the magnet embedding holes 35a and 35b are caused to communicate with the outer periphery of the rotor, the permanent magnets 34a and 34b are supported with an even stress over the whole length thereof by the outer peripheral edge portion 33. Therefore, stress is unlikely to be generated in the interiors of the permanent magnets 34a and 34b, and the permanent magnets 34a and 34b can be protected from damage.

As another characteristic of this embodiment, there is the q axis projection 37. The q axis projection 37 can generate strong reluctance torque, which contributes to an increase in torque generated in the rotor.

Furthermore, as another characteristic of this embodiment, there is the form of the outer peripheral edge portion 33. When unevenness is provided in the outer peripheral surface of the rotor, a higher harmonic component of torque generated in the rotor can be converted to a fundamental wave component, whereby torque ripple can be reduced and torque increased. Meanwhile, it is widely known that when force is applied to the uneven portion, locally high stress is generated due to a phenomenon called stress concentration.

When there is a rotor in which no magnet embedding hole communicates with the outer periphery of the rotor and the outermost periphery is connected in a ring form, as in the existing example, assembly residual stress remains in the ring-form region in the vicinity of the outer peripheral surface of the rotor. Therefore, the rotor in the existing example is such that it is difficult to provide unevenness that leads to stress concentration in the outermost peripheral surface of the rotor in which this kind of residual stress remains.

In this embodiment, however, the magnet embedding holes 35a and 35b are caused to communicate with the outer periphery of the rotor, because of which no residual stress remains in the outer peripheral edge portion 33, which is the outermost peripheral region of the rotor 3. Consequently, in this embodiment, it is easy to provide unevenness in the outer peripheral surface of the outer peripheral edge portion 33, which is the outermost peripheral region of the rotor 3, in order to increase torque.

Therefore, in this embodiment, the radius of curvature of the outer peripheral surface of the outer peripheral edge portion 33, which is on the outer side of the permanent magnets as seen from the rotational center of the rotor, is smaller than the distance from the rotational center of the rotor to the outermost peripheral portion of the rotor. In this way, in this embodiment, torque ripple generated in the rotor 3 can be reduced and torque increased, without increasing the generation of stress.

Also, as a characteristic of this embodiment, there are the magnet embedding holes 35a and 35b arrayed in a reverse V-shape. A description of advantages obtained from this characteristic is as follows.

Firstly, in the process of interference fitting the shaft into the rotor 3, tensile stress remains in the circumferential direction in the rotor steel material. This residual stress barely occurs in a circumference having a radius the same as that of the magnet embedding holes 35a and 35b. Consequently, the rotor 3 in this embodiment is such that hardly any assembly residual stress remains further outward in the rotor radial direction than the inscribed circle 36 of the magnet embedding holes 35a and 35b.

Meanwhile, tensile stress (centrifugal stress) caused by centrifugal force is generated in the center bridge 32 when the rotor 3 rotates. When the magnet embedding holes 35a and 35b are arrayed in a reverse V-shape, the position of the center bridge 32 is further outward in the rotor radial direction than the inside of the inscribed circle 36, where residual stress mainly occurs.

In this way, according to this embodiment, the center bridge 32 in which centrifugal stress concentrates when the rotor 3 rotates is disposed distanced from the inside of the inscribed circle 36, where residual stress caused by the interference fit process mainly occurs, because of which the strength of the center bridge 32 when the rotor 3 rotates can be increased.

Also, in this embodiment, the positioning projections 38a and 38b are provided in the outer peripheral edge portion 33 on the outer side in the radial direction as seen from the permanent magnets 34a and 34b. Consequently, by the permanent magnets 34a and 34b being pressed against and held by the positioning projections 38a and 38b, imbalance in centrifugal force generated in the two permanent magnets 34a and 34b forming one pole can be prevented, and imbalance in the distribution of magnetic flux generated by the permanent magnets can be prevented.

Although there is a method whereby a positioning projection is provided in rotor steel material on the inner side in a radial direction as seen from a permanent magnet, as in an existing example, there is a problem in using this method when the magnet embedding holes 35a and 35b are disposed in a reverse V-shape. This is because the positioning projection is provided in the vicinity of a range in which assembly residual stress occurs. When a positioning projection is provided, a depression occurs at the same time. Stress concentration is essentially liable to occur in a depression. In this case, provided that chamfering of the depressed portion can be carried out by increasing a chamfer radius, the stress concentration can be relaxed to an extent, but as a chamfer radius such that stress can be sufficiently relaxed is often equivalent to, or greater than, the thickness of the magnet, the positioning function is not fulfilled. Therefore, providing a positioning projection in rotor steel material on the inner side in a radial direction as seen from a permanent magnet, as in the existing example, is not desirable, as the strength of the positioning projection with respect to assembly residual force is reduced.

In addition, in this embodiment, permanent magnet leakage flux, which has the center bridge as a path, is considerably reduced by the centre bridge 32 being demagnetized. Therefore, magnetic flux that interlinks with the stator winding can be increased, which contributes to an increase in torque.

A structure that magnet centrifugal force is supported with one center bridge, as in this embodiment, is advantageous when demagnetizing one portion of the rotor, for the following reason.

Ferrite and martensite are body-centered cubic lattices, in which interstitial distance is long. Meanwhile, austenite is a face-centered cubic lattice, in which interstitial distance is short. That is, generally, dimensions tend to contract when the material is changed from ferrite or martensite to austenite.

As examples of achieving an increase in torque by carrying out demagnetization of a bridge by austenitizing, in the same way as in this embodiment, there are JP-A-2002-69593, JP-A-2005-269840, JP-A-2013-143791 and the like, but a large stress is generated simultaneously with these demagnetization processes being carried out. This is because these processes are such that a portion connected in a ring form centered on the axis of rotation is austenitized.

With this kind of form, the dimensions of the bridge portion are restricted, because of which a large stress is generated when contraction occurs. For example, in the case of a common electromagnetic steel plate, the Young's modulus is in the region of 200 (GPa), and even when a small contraction of in the region of, for example, 0.1(%) occurs, a simple calculation says that stress of 200 (MPa) is generated. However, the yield stress of a common electromagnetic steel plate is in the region of 400 (MPa), because of which it is necessary to design so that assembly residual stress and centrifugal force fall within the range of the remaining 200 (MPa). For this reason, JP-A-2002-69593, JP-A-2005-269840, JP-A-2013-143791 and the like are such that a large stress is generated in the bridge at the point at which demagnetization is carried out, as a result of which the allowable centrifugal stress decreases. This leads to a limit in rotation speed and a limit in magnet quantity, which limits motor performance.

The same applies to a center bridge when there is a side bridge (the dimensions of the center bridge are restricted by the side bridge).

In response to this, a structure that magnet centrifugal force is supported with one center bridge, as in the structure according to this embodiment, is such that leakage flux can be interrupted when a region whose dimensions are not restricted (the center bridge) is austenitized. No stress is generated by demagnetization of a region whose dimensions are not restricted, and which can expand and contract freely.

As heretofore described, this embodiment is superior in terms of strength, even when compared with the disclosures of JP-A-2002-69593, JP-A-2005-269840, JP-A-2013-143791 and the like.

According to this embodiment, as heretofore described, a permanent magnet embedded type rotating electrical machine that has superior rotor strength, and that can be manufactured at low cost, can be realized. Also, according to this embodiment, torque generated by the rotor can be increased without reducing the strength of the rotor.

Heretofore, a description has been given of an embodiment of the invention, but other embodiments of the invention are conceivable.

(1) For example, in the heretofore described embodiment, carrying out a nitriding process in advance is given as an example of austenitization, but there need not be a nitriding process.

(2) Also, an example in which Ni and Cr, which are austenite stabilizing elements, are not added is given in the heretofore described embodiment, but Ni or Cr may be added.

(3) Also, changing the material is given as an example of demagnetization in the heretofore described embodiment, but permeability may be reduced using work hardening or thermal distortion. For example, when manufacturing the rotor, the permeability of the center bridge may be reduced by carrying out local heating of the center bridge in the rotor steel plate using a laser or electron beam, and subsequently carrying out slow cooling. Processing and distortion are always accompanied by dimensional change, because of which stress is generated when there is a side bridge. In the case of a center bridge, however, this kind of stress is not generated even when dimensional change occurs due to work hardening or the like.

(4) Also, a silicon steel plate is used as the rotor material in the heretofore described embodiment, but a general steel material may be used, or a ferrite series or martensite series ferromagnetic stainless steel, or austenite series stainless steel ferromagnetized by work hardening, may be used.

(5) Also, interference fitting is given as a method of coupling with the shaft in the heretofore described embodiment, but a method whereby torque transmission is carried out with a key after clearance fitting, or a method whereby torque transmission is carried out with a spline or similar structure, may be employed. In the case of clearance fitting, no assembly residual stress occurs even when there is a side bridge, but stress due to dimensional change caused by austenitization or thermal distortion is generated, and shear stress due to centrifugal force is also generated.

(6) Also, in the heretofore described embodiment, the invention is applied to a motor, but the invention is of course also applicable to a generator.

Figure 4:
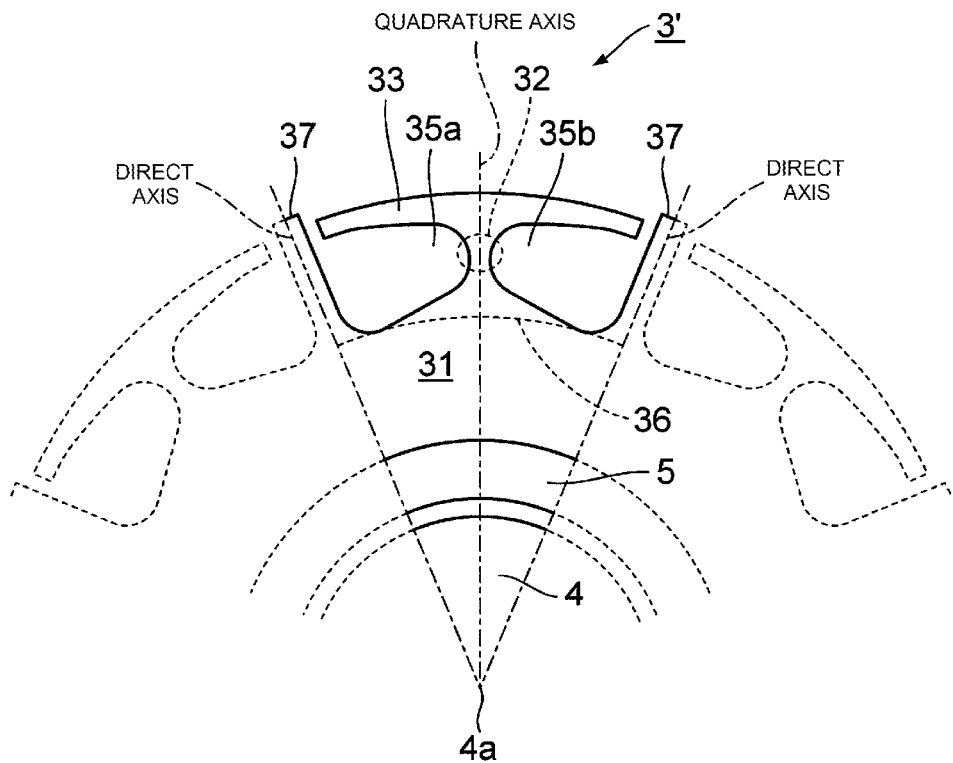
FIG. 4 is a front view showing a configuration of a rotor of a synchronous reluctance rotating electrical machine, which is another embodiment of the invention.

(7) Also, a permanent magnet embedded type motor is given as an example in the heretofore described embodiment, but the invention is also applicable to a magnetless motor such as a synchronous reluctance motor. FIG. 4 is a front view showing a configuration of a rotor 3' of a synchronous reluctance motor, which is another embodiment of the invention. In the rotor 3', the holes 35a and 35b do not hold motors, and perform a role of reducing quadrature axis inductance. In FIG. 4, in order to achieve an increase in torque, one portion or a whole of the outer peripheral surface of the outer peripheral edge portion 33 preferably has a radius of curvature greater than the distance from the central axis of rotation 4a of the rotor to an outermost peripheral portion of the rotor. Also, it is not necessary that the outer peripheral surface of the outer peripheral edge portion 33 is a curved surface, as it is sufficient that the distance from the rotational center of the rotor of the outer peripheral surface of the outer peripheral edge portion 33 located on an extension of a straight line that passes through the center bridge 32 as seen from the rotational center of the rotor is shorter than that of the outer peripheral surface in another position. This form has an advantage of increasing torque in a reluctance motor. In the case of this kind of synchronous reluctance motor, centrifugal stress decreases by an amount commensurate with the absence of magnets, but when there is a side bridge, assembly residual stress occurs in the side bridge, and shear stress is also generated due to centrifugal force generated in the outer peripheral edge portion 33. As the configuration shown in FIG. 4 is such that the holes 35a and 35b communicate with the outer periphery of the rotor, this kind of problem does not occur. Also, the same advantages as in the heretofore described embodiment are obtained by demagnetizing, or reducing the permeability of, the center bridge 32.

Figure 5:
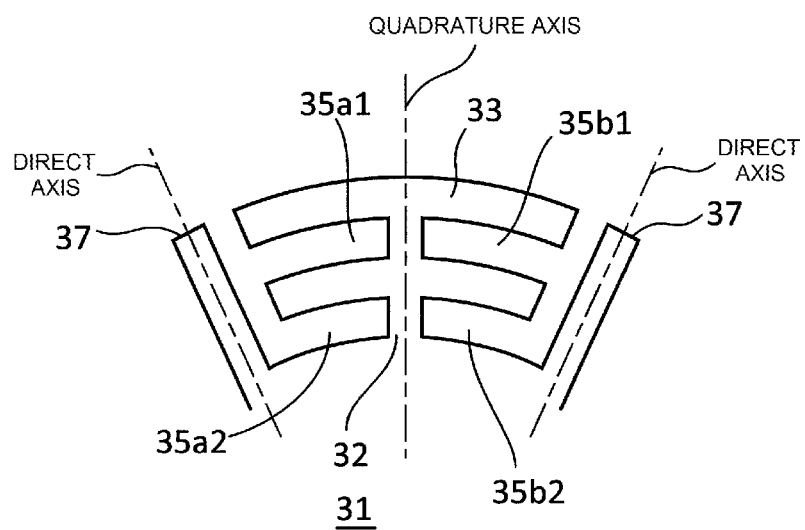
FIG. 5 is a front view showing a configuration of a rotor of a synchronous reluctance rotating electrical machine, which is another embodiment of the invention.

(8) In the heretofore described embodiment, two holes sandwiching the center bridge are formed in the rotor in order to form one pole. However, the number of holes provided with respect to one center bridge not being limited to two, it is sufficient that there is an even number thereof. For example, in order to form one pole, a multiple of pairs of holes sandwiching the center bridge 32 in the rotor rotation direction may be formed in the rotor radial direction. FIG. 5 shows a configuration example of a rotor of this kind of synchronous reluctance motor. In this example, there are two quadrature axis holes 35a1 and 35a2 aligned in the rotor radial direction on the left side in the rotor rotation direction of the center bridge 32, and there are two quadrature axis holes 35b1 and 35b2 aligned in the rotor radial direction on the right side in the rotor rotation direction of the center bridge 32. Each of the quadrature axis holes 35a1, 35a2, 35b1, and 35b2 communicates with the outer periphery of the rotor on the side opposite to that of the center bridge 32. In this example, two pairs of holes sandwiching the center bridge 32 are formed in the rotor radial direction in order to form one pole, but three or more pairs of holes may be formed. Also, this configuration is applicable not only to a synchronous reluctance rotating electrical machine, but also to a permanent magnet embedded type rotating electrical machine. That is, the quadrature axis holes in FIG. 5 may be used as holes for embedding permanent magnets, thereby configuring the rotor of a permanent magnet embedded type rotating electrical machine.

Figure 6:
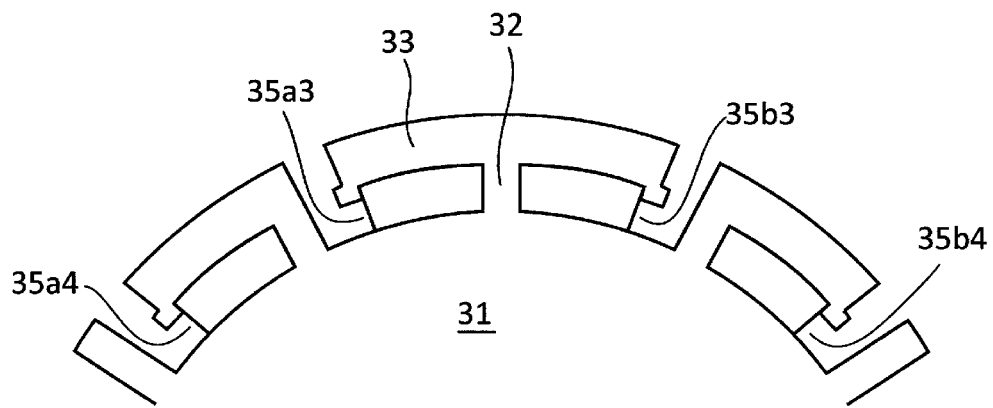
FIG. 6 is a front view showing a configuration of a rotor of a permanent magnet embedded type rotating electrical machine, which is another embodiment of the invention.

(9) In the heretofore described embodiment, one hole is formed in the rotor on either side of the center bridge in the rotor rotation direction in order to form one pole, but two or more holes may be formed on either side in the rotor rotation direction in order to form one pole. FIG. 6 shows a configuration example of a rotor of this kind of permanent magnet embedded type rotating electrical machine. In this example, there are two permanent magnet embedding holes 35a3 and 35a4 aligned in the rotor rotation direction on the left side in the rotor rotation direction of the center bridge 32, and there are two permanent magnet embedding holes 35b3 and 35b4 aligned in the rotor rotation direction on the right side in the rotor rotation direction of the center bridge 32. In this example, one pair of the holes 35a3 and 35b3 and one pair of the holes 35a4 and 35b4 sandwiching the center bridge 32 are formed in order to form one pole, but three or more pairs of holes may be formed.

Figure 7:
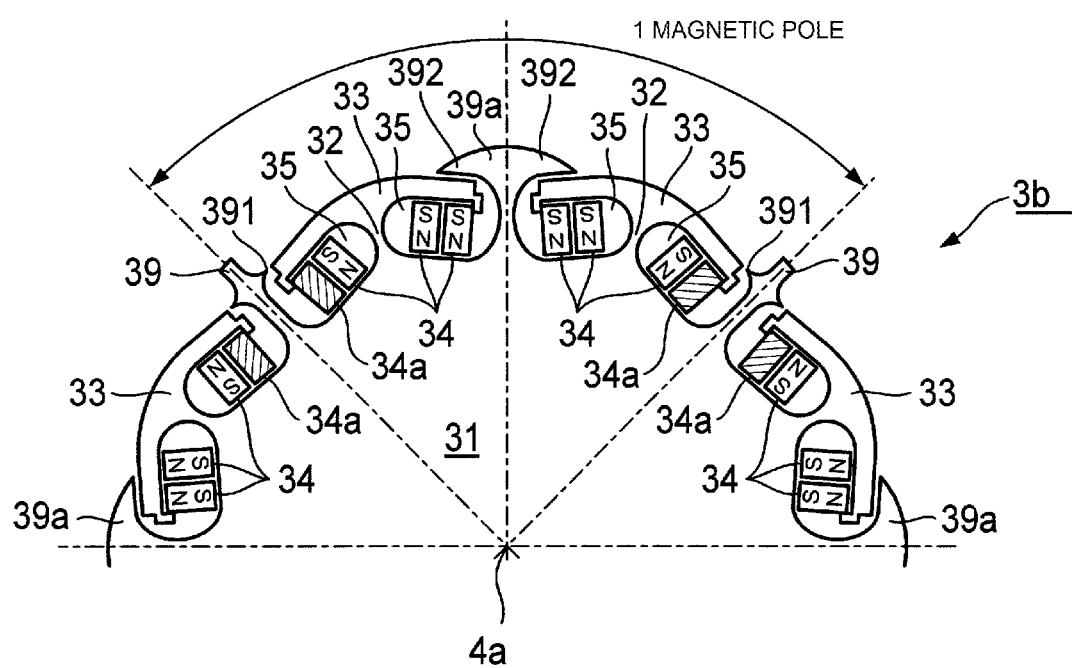
FIG. 7 is a front view showing a configuration of a rotor of a permanent magnet embedded type rotating electrical machine, which is another embodiment of the invention.
Figure 8A:
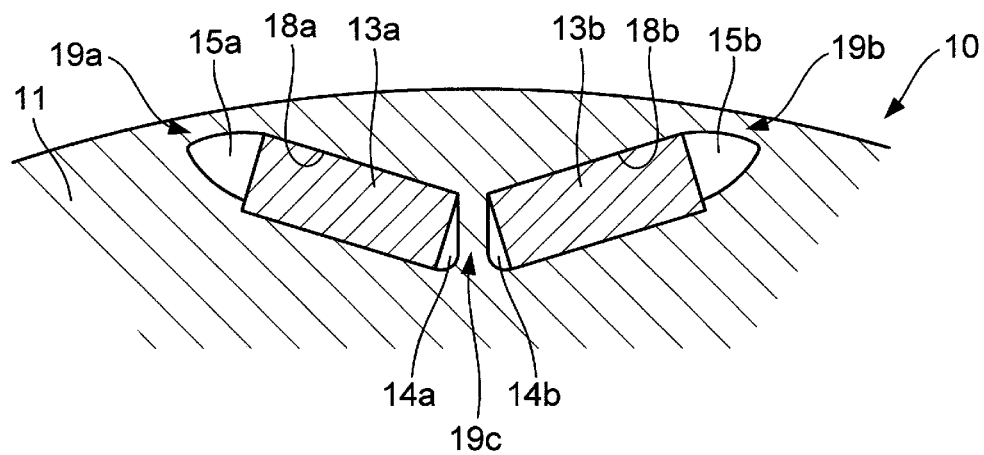
FIGS. 8A, 8B and 8C are diagrams showing a configuration of a rotor of an existing permanent magnet embedded type rotating electrical machine.
Figure 8B:
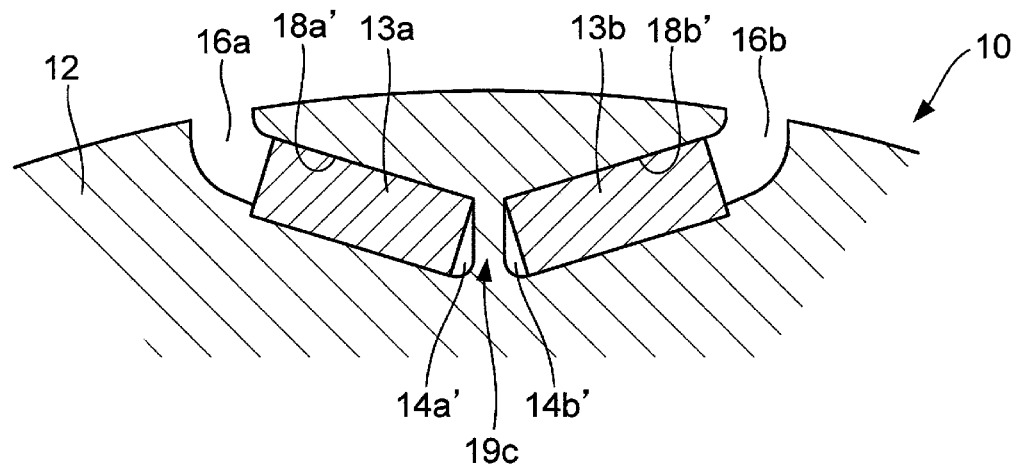
Figure 8C:
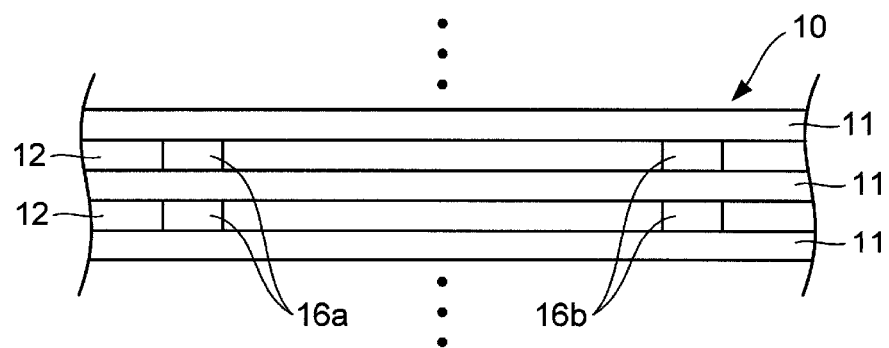

(10) In the heretofore described embodiment, one center bridge is provided for each pole in the rotor rotation direction, but multiple center bridges may be provided for each pole in the rotor rotation direction. FIG. 7 is a diagram showing a configuration example of a rotor 3b of this kind of permanent magnet embedded type rotating electrical machine.

In the rotor 3b, two center bridges are provided for each pole in the rotor rotation direction. Two holes 35 are formed, one on either side in the rotor rotation direction of each center bridge 32. The core portion 31 of the rotor 3b is connected via each center bridge 32 to the outer peripheral edge portion 33 on the outer side in the rotor rotation direction of the holes 35. Of the four holes 35 in one pole, two magnets 34 are embedded in the rotor rotation direction in each of the two holes 35 in the center. Also, of the four holes 35 in one pole, each of the two holes 35 on the outer sides in the rotor rotation direction is such that one magnet 34 is embedded on the inner side in the rotor rotation direction, and one weight 34a is embedded on the outer side in the rotor rotation direction. Also, in the rotor 3b, two radiating projections 39 protrude in the vicinity of a boundary between magnetic poles, and one radiating projection 39a protrudes in the vicinity of the center of a magnetic pole. The above is an outline configuration of one magnetic pole in the rotor 3b. Further, in the example shown in FIG. 7, four magnetic poles are configured in the whole of the rotor 3b.

Of the three radiating projections in one magnetic pole, the two radiating projections 39 on either side in the rotor rotation direction protrude in a direction away from the central axis of rotation 4a. A chevron form side surface projection 391, an apex portion of which faces a corner portion of the outer peripheral surface of the outer peripheral edge portion 33 on either side of the radiating projection 39, is formed on a side surface on either side in the rotor rotation direction of the radiating projection 39. Also, of the three radiating projections in one magnetic pole, the central radiating projection 39a is of an umbrella form. Hereafter, therefore, the radiating projection 39a in the center in the rotor rotation direction is referred to as the umbrella form radiating projection 39a. The umbrella form radiating projection 39a has a side surface projection 392 that covers one portion or the whole of the two outer peripheral edge portions 33 on either side in the rotor rotation direction from the outer peripheral side of the rotor. As opposed to this, the two radiating projections 39 have the chevron form side surface projection 391, but the side surface projection 391 is distanced in the rotor rotation direction from an end portion of the outer peripheral edge portion 33. That is, in this aspect, distances in the rotor rotation direction from the outer peripheral edge portion 33 differ among the multiple radiating projections, and the distance between the umbrella form radiating projection 39a located in the center of the magnetic pole and the outer peripheral edge portion 33 is shorter than the distance between the band form radiating projection 39 located on the boundary between magnetic poles and the outer peripheral edge portion 33.

Also, in this aspect, the width of a portion of the umbrella form radiating projection 39a located in the center of the magnetic pole on the inner side in the rotor radial direction of the side surface projection 392 (a dimension in the rotor rotation direction) is smaller than the width of the band form radiating projection 39 on either side in the rotor rotation direction.

Also, in this aspect, the distance between the outermost periphery of the umbrella form radiating projection 39a located in the center of the magnetic pole and the central axis of rotation 4a is longer than the distance between the outermost periphery of the outer peripheral edge portion 33 and the central axis of rotation 4a. That is, the outermost periphery of the umbrella form radiating projection 39a is nearer to the stator than the outermost periphery of the outer peripheral edge portion 33.

In this aspect, the outer peripheral surface of the rotor is such that the outer peripheral edge portion 33 and the radiating projections 39 and 39a having the side surface projections 391 and 392 respectively are more or less smoothly connected, meaning that air flow deviation is unlikely to occur. Consequently, according to this aspect, windage of the rotor 3b can be reduced.

Also, this aspect is such that the number of magnetic poles in the rotor 3b can be reduced in comparison with that in the heretofore described embodiment (refer to FIG. 2 and FIG. 3). Hereafter, advantages of this will be described.

a. Firstly, in this aspect, the umbrella form radiating projection 39a in the center of the magnetic pole covers a wide range of the outer peripheral edge portions 33 on either side in the rotor rotation direction of the umbrella form radiating projection 39a, and the distance from the outer peripheral edge portion 33 is short. Therefore, in this aspect, the magnetic resistance between the umbrella form radiating projection 39a in the center of the magnetic pole and the two outer peripheral edge portions 33 is low.

b. Also, the umbrella form radiating projection 39a in the center of the magnetic pole is nearer than the outer peripheral edge portion 33 to the stator, and the magnetic resistance between the umbrella form radiating projection 39a and the stator is low. Therefore, magnetic flux easily passes through the center of the magnetic pole where the umbrella form radiating projection 39a exists.

c. Also, the width of a portion of the umbrella form radiating projection 39a in the vicinity of the radial direction center is small. Therefore, magnetic short-circuiting with the umbrella form radiating projection 39a as a path is unlikely to occur.

d. Also, in this aspect, a weight 34a, which does not have magnetomotive force, is disposed on either side in the rotor rotation direction, and magnetomotive force in the vicinity of the umbrella form radiating projection 39a is high. Therefore, magnetomotive force distribution close to one sine wave is obtained within the range of one magnetic pole.

In this aspect, owing to the advantages of a to d, a range including two center bridges 32 is adopted as one magnetic pole, as shown in FIG. 7, and the number of magnetic poles in the whole of the rotor can be reduced by half. Therefore, the control speed of an inverter that drives a permanent magnet embedded type rotating electrical machine can be reduced by half compared with that of a rotor including one center bridge 32 per magnetic pole.

Further, in this aspect, the center bridge 32 is demagnetized, in the same way as in the heretofore described embodiment (FIG. 2 and FIG. 3). Consequently, in the same way as in the heretofore described embodiment, the width in the rotor rotation direction of the center bridge 32 can be increased, and the strength of the center bridge 32 when the rotor 3b rotates can be increased.

REFERENCE SIGNS LIST

1 . . . Frame, 2 . . . Iron core, 3, 3', 3b . . . Rotor, 31 . . . Core portion, 32 . . . Center bridge, 33 . . . Outer peripheral edge portion, 34a, 34b . . . Permanent magnet, 35a, 35b, 35a1 to 35a4, 35b1 to 35b4 . . . Hole, 36 . . . Inscribed circle, 37 . . . q axis projection, 38a, 38b . . . Positioning projection, 39, 39a . . . Radiating projection, 391, 392 . . . Side surface projection, 4 . . . Shaft, 4a . . . Central axis of rotation, 5 . . . Rolling bearing, 6 . . . Shield

What is claimed is:

1. A rotating electrical machine, comprising
a rotor having a plurality of plates which are directly stacked on one another, the plurality of plates consisting of one kind of steel plates so that the rotor has a substantially same cross-sectional form in any plane cut vertically through a rotation axis of the rotor, each plate having first and second holes that are provided in each of a plurality of poles disposed circumferentially of each plate, wherein in said each pole of said each plate of the rotor:
each of the first and second holes has a first side and a second side opposite to the first side in the circumferential direction,
a center bridge is formed between the second sides of the first and second holes,
each of the first and second holes at the first side open into an outer periphery of the rotor,
a side face at an inner side of the rotor of each of the first and second holes has a first point and a second point that is closer to the center bridge than is the first point, the side face at the inner side being inclined in a plan view of the rotating electrical machine such that the first point is located from a center of the rotor closer than is the second point, the center bridge is demagnetized, or a permeability of the center bridge is lower than a permeability of a portion of the rotor other than the center bridge, the first and second holes form an inverted-V shape having a tip at the center bridge, and the tip of the inverted-V shape is located farther from the center of the rotor than is both ends of the inverted-V shape, and the first and second holes are completely separated by the center bridge.

2. The rotating electrical machine according to claim 1, wherein the rotating electrical machine is a synchronous reluctance rotating electrical machine.

3. The rotating electrical machine according to claim 2, wherein one portion or a whole of an outer peripheral surface of an outer peripheral edge portion has a radius of curvature greater than a distance from a central axis of rotation of the rotor to an outermost peripheral portion of the rotor.

4. The rotating electrical machine according to claim 1, wherein the rotor has a q axis projection that protrudes in a direction away from a central axis of rotation of the rotor between neighboring poles.

5. The rotating electrical machine according to claim 4, wherein at least one of the first and second holes holds a permanent magnet, and the rotating electrical machine is a permanent magnet embedded type rotating electrical machine.

6. The rotating electrical machine according to claim 4, wherein the rotating electrical machine is a synchronous reluctance rotating electrical machine.

7. The rotating electrical machine according to claim 1, wherein at least one of the first and second holes holds a permanent magnet, and the rotating electrical machine is an embedded type permanent magnet rotating electrical machine.

8. The rotating electrical machine according to claim 7, wherein one portion or a whole of an outer peripheral surface of an outer peripheral edge portion has a radius of curvature smaller than a distance from a central axis of rotation of the rotor to an outermost peripheral portion of the rotor.

9. The rotating electrical machine according to claim 7, wherein a region of an inner wall of the at least one of the first and second holes on an outer side in the radial direction of the rotor has a positioning projection that restricts movement of the permanent magnet.

10. The rotating electrical machine according to claim 7, wherein fixing of the permanent magnet is aided by an adhesive.

11. The rotating electrical machine according to claim 1, wherein the center bridge is demagnetized, or the permeability thereof is reduced, by a transformation or causing of distortion to be carried out by utilizing heat treatment or work hardening.

12. The rotating electrical machine according to claim 11, wherein the rotor has a q axis projection that protrudes in a direction away from a central axis of rotation of the rotor between neighboring poles.

13. The rotating electrical machine according to claim 11, wherein at least one of the first and second holes holds a permanent magnet, and the rotating electrical machine is a permanent magnet embedded type rotating electrical machine.

14. The rotating electrical machine according to claim 11, wherein the rotating electrical machine is a synchronous reluctance rotating electrical machine.

15. The rotating electrical machine according to claim 11, wherein the center bridge is located on an outer side, in a radial direction of the rotor, of an inscribed circle of the first and second holes.

16. The rotating electrical machine according to claim 15, wherein the rotor has a q axis projection that protrudes in a direction away from a central axis of rotation of the rotor between neighboring poles.

17. The rotating electrical machine according to claim 15, wherein at least one of the first and second holes holds a permanent magnet, and the rotating electrical machine is a permanent magnet embedded type rotating electrical machine.

18. The rotating electrical machine according to claim 15, wherein the rotating electrical machine is a synchronous reluctance rotating electrical machine.

19. A rotor, comprising:

a plurality of plates that are directly stacked on one another, the plurality of plates consisting of one kind of steel plates so that the rotor has a substantially same cross-sectional form in any plane cut vertically through a rotation axis of the rotor, each plate having first and second holes that are provided in each of a plurality of poles disposed circumferentially of each plate, wherein in said each pole of said each plate of the rotor:

a center bridge is formed between the first and second holes, each of the first and second holes have lower edges that incline outwardly in a rotor radial direction and toward the center bridge, and the farther a point is located from the center bridge in each lower edge, the smaller is a distance between the point and a center of the rotor, the center bridge has a lower permeability than another portion of the rotor, the first and second holes form an inverted-V shape having a tip at the center bridge, and the tip of the inverted-V shape is located farther from the center of the rotor than is both ends of the inverted-V shape, and the first and second holes are completely separated by the center bridge.

20. The rotor of claim 19, further comprising magnets in the holes.

* * * * *